Sept. 12, 1939. D. K. ALLISON 2,172,352
PH COMPARATORS AND METHOD OF PRODUCING SAME
Filed Sept. 20, 1937
Fig. 1.
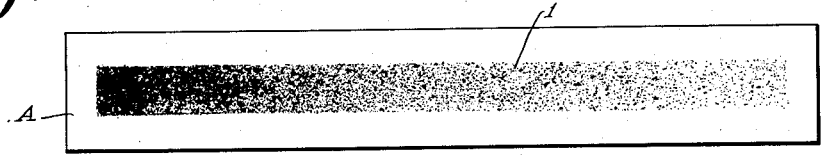
Fig. 2.
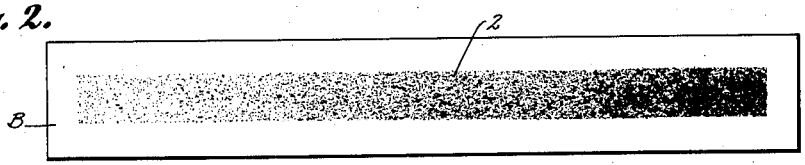
Fig. 6.
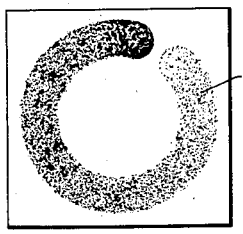
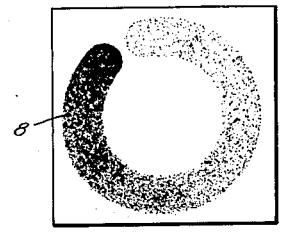
Fig. 7.
Fig. 3.
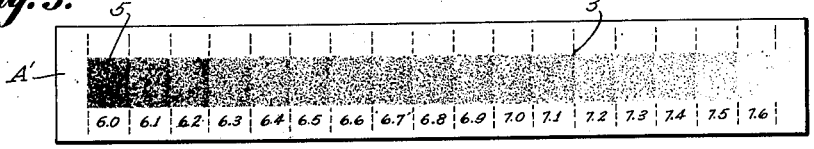
Fig. 4.
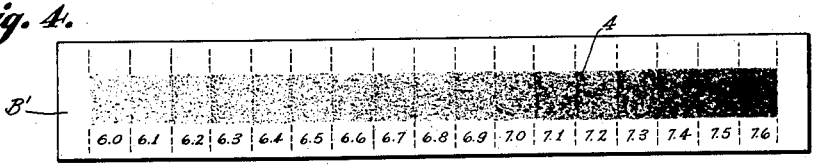
Fig. 5.
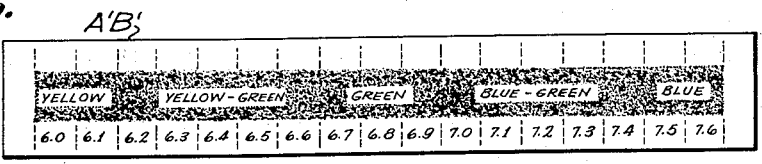
Inventor
Donald K. Allison
By Arthur P. Knight and
Alfred W. Knight
Attorneys Patented Sept. 12, 1939

2,172,352

UNITED STATES PATENT OFFICE 2,172,352 pH COMPARATORS AND METHOD OF PRODUCING SAME

Donald K. Allison, Beverly Hills, Calif., assignor to National Technical Laboratories, Pasadena, Calif., a corporation of California Application September 20, 1937, Serial No. 164,723

11 Claims. (Cl. 95—5)

This invention relates to a method of producing colored scales useful in the matching of indicator colors employed in determinations of hydrogen ion concentrations, and to the color scales so produced.

The principal object of the invention is to provide a method of producing color scales which has the combined advantages of fidelity of reproduction and low cost.

The principle of making colorimetric measurements of hydrogen ion concentrations is based upon the known characteristics of various "indicators" of changing color when they are subjected to different concentrations of acid ions, and the expression "pH" has been employed in the designation of such concentrations. For example, a hydrogen ion concentration of 0.00001 mol per litre is designated as pH 5, the numeral "5" indicating the negative logarithm to the base 10 of the hydrogen ion concentration. In order to make accurate pH determinations it is considered necessary to utilize indicators with relatively short color-change ranges, so that the color changes are distinct within a relatively narrow band of pH values, a plurality of different indicators customarily being employed to cover the conventional range of pH 0.0 to pH 14.0. As a specific example, the dye Bromthymol Blue is useful within a range of pH 6.0 to pH 7.6, varying from a yellow-orange through green to a definite blue, the intermediate color changes being sufficiently distinct to provide visual estimation of the pH value within a difference of ±0.05. Other indicators, such as Meta Cresol Purple, Bromphenol Blue, Chlorphenol Red, et cetera, are employed for other portions of the pH scale, as is well known in the art.

In any visual determination or estimation of pH value by observation of the color of an indicator, the employment of some form of color standard is required, several forms of which are available and known as "comparators". One form of comparator comprises a plurality of sealed tubes containing solutions of definite pH values with the proper quantity of indicator dye, the tubes being supplied in sets of eight or ten for the range of a given dye, and usually differing by a pH of 0.2. Another form of comparator comprises a circular disc provided with a plurality of windows carrying glasses which differ in color in correspondence to the difference in color of a particular dye at various pH values.

The present invention is concerned with the production of a novel form of comparator, and is directed both to the method of producing such comparators, and to the comparators so produced.

An important object of the invention is to provide a method of producing pH comparators by a photographic process based upon the actual spectrum changes in a particular indicator dye, in which corresponding actual color changes are produced on a transparent medium.

As pointed out in my issued patent, No. 2,063,140, the blue component of a dye such as Bromthymol Blue is quite negligible at pH 6.0, while the yellow component is quite strong, and at 7.6 the yellow component is fairly weak while the blue component is very strong (see Fig. 9 of said patent). According to the present invention, the changes in the respective color components of a particular indicator dye are photographically reproduced on a transparent medium, in strict correspondence to the actual transmissions at the characteristic wave-lengths concerned. The process comprises, essentially, the determination of the spectrum transmission of a particular indicator dye at various pH values within its range, the photographic exposure and development of a photosensitive surface to produce a deposit which varies in accordance therewith, and the conversion of such deposit into a dye-image of corresponding density and of the proper color. In its broader aspects, the invention contemplates the production of single-color intensity variation comparators for use with indicators such as phenolphthalein as well as double-color intensity variation comparators for use with indicators such as the above-mentioned Bromthymol Blue and multi-color intensity variation comparators for use with indicators of the type known as "wide-range" indicators.

The accepted procedure for using comparators such as herein described is as follows: The specimen liquid of unknown pH value is placed in a glass or other transparent receptacle, and a definite quantity of the particular indicator dye is added to the specimen. The specimen receptacle is then viewed by transmitted light, and the resulting color is compared with the proper comparator for that particular indicator dye, and the portion of the comparator (which is viewed by the same transmitted light) which most closely approximates the actual color of the specimen is selected, and the indicated pH value of that portion is then observed. It will be appreciated that any given comparator is constructed for use with a solution of a given indicator dye at a specific concentration, and that a specific depth of such solution is viewed by transmitted light, so that the color and intensity of the specimen and the comparator will balance at the comparator reading corresponding to the pH value of the specimen. Throughout the present specification and claims, therefore, it will be appreciated that the color standards adopted for the comparators will be selected specifically for use with test solutions of the particular indicator dye at such specific concentration and depth of solution under observation.

It will be further appreciated that the dye used to stain the photographic emulsion in the production of the desired dye image will be one which substantially reproduces, to the eye, the color of the particular color component of the dye which is being duplicated in the comparator. The color matching by the staining dye is not necessarily exact, but should be sufficiently approximate that the ordinary eye will not be conscious of significant differences between the color of the specimen and the corresponding portion of the comparator. It will further be appreciated that the observations of the spectrum transmission characteristics of the indicator dye may be made at one or more relatively narrow color bands in order to determine the photographic exposure values necessary, but that the dye which is applied to the gelatine structure in the production of the comparator will not be a monochromatic dye, but will possess some transmission over a considerable range of wavelengths, comparable to the transmission characteristics of the indicator dye itself.

As a specific example of the practice of the present invention, I may prepare a comparator for use with a Bromthymol Blue indicator in the following manner: The spectrum transmission characteristics of a specific solution of such indicator dye are determined at selected color bands (as adjacent 440Mu and 615Mu wavelengths, for example) lying within the respective predominating colors (yellow and blue) of the dye, throughout the pH range of the dye (as from pH 6.0 to pH 7.6). Two photographic surfaces are then exposed, one in accordance with the transmission values obtained at the 440Mu band, and the other in accordance with the values obtained at the 615Mu band, each of such surfaces being exposed in such manner as to produce an elongated exposed area which is uniformly exposed over its width, but exposed to predetermined graduated degrees along its length. These surfaces then may be developed to obtain elongated images which vary in density along their length in accordance with the quantity of light of the respective wave-lengths which would be transmitted through a body of solution of the dye throughout the aforesaid pH range.

The surface containing the image representing the blue component of the light then may be bleached and dyed with Methylene Blue (Schultz No. 618) for example, using any operative dye-toning technique. The other surface, corresponding to the yellow component of the light, may be bleached and dyed with a yellow dye such as Thioflavine "T" (Schultz No. 659). The two surfaces will then comprise colored transparencies, varying from a very faint color at one end to a deep color at the other end. The two transparencies are then superimposed, with the deep colored portion of one overlying the faintly colored portion of the other, producing a composite screen varying in color from yellow to blue, with its intermediate portions varying from yellow-green, through green, to a blue-green.

The accompanying drawing illustrates certain embodiments of the invention, and referring thereto:

Figs. 1 and 2 represent the two cooperating color screens, in which the color gradation varies continuously from one end of the scale to the other;

Figs. 3 and 4 represent comparable screens in which the color gradation varies in steps;

Fig. 5 illustrates the appearance of a completed comparator, formed by superimposing the screens shown in Figs. 3 and 4, and Figs. 6 and 7 represent screens comparable to those shown in Figs. 1 and 3, and 2 and 4, respectively, in which the gradated color areas are laid out in circular form.

Figs. 1 and 2 illustrate the appearance of two strips A and B, provided with color areas 1 and 2 which respectively provide the desired color components within the desired range. Where the comparator is for use with Bromthymol Blue the color area on the strip A will be a deep yellow at the left end, for example, and substantially colorless at the right end, while the color area 2 on the strip B will be substantially colorless at the left end and a deep blue at the right end. When the two strips A and B are superimposed, with the colorless end of the strip A overlying or overlaid by the deeply colored end of the strip B, the combined color will be a deep yellow at the left end and a deep blue at the right end, passing through yellow-green, green, and blue-green from left to right, as viewed by transmitted light.

Each of the color areas 1 and 2 shown on the strips A and B may be prepared in any suitable manner involving a photographic process based upon the actual spectrum changes in a particular indicator dye, using an appropriate dye-toning procedure with a basic or acid dye having color-transmission characteristics substantially comparable to the color-transmission characteristics of one color component of such indicator dye. In general, the procedure comprises the photographic exposure of a photosensitive surface, the subsequent physical or chemical development of such surface to provide a dye-receiving matrix, and the subsequent dyeing of such matrix with a dye substantially reproducing a particular color band which is characteristic of the indicator dye to be matched, the respective procedures of exposing and developing the photosensitive surface, and the production of the dye-image each being carried out with specific reference to the photosensitivity and development characteristics of the photosensitive surface, and in accordance with the spectrum transmission characteristics of the particular indicator dye at the selected color band, so that the finished color screen or dye image varies in intensity over its area, the variation being in substantial accordance with the color-transmission characteristics of such indicator dye.

Where a photosensitive silver surface is employed, the exposure and development is so selected that a silver image is secured which varies in density from one end to the other in accordance with the depth of color desired in the finished color screen, and this silver image may be converted into a dye image according to any of the accepted dye-toning procedures. As a specific example of this type of procedure, I may expose a silver emulsion according to the predetermined graduated degree along an elongated area, develop and "fix" the resultant silver image, and immerse the resultant negative in a solution adapted to convert the silver image into a compound of silver which will serve as a mordant for the selected dye. In the event that a basic dye is to be employed, I may use a solution which comprises:

| | Parts |
|---|---|
| Iodine | 15 |
| Potassium iodide | 60 |
| Acetic acid | 25 |
| Water | 1000 |

The negative is then immersed in a 1 to 5% aqueous solution of sodium bisulfite to clear the excess elemental iodine from the emulsion, and is then thoroughly washed in water. The negative is then ready for the dyeing operation, and may be immersed in a 0.1 to 1.0% aqueous solution of the desired dye. The excess silver iodide may then be removed by clearing in a so-called "mordanting sodium thiosulphate (photographic Hypo) solution", such as a tannic acid Hypo solution, washed, and dried.

Where it is desired to employ an acid dye, a chromic acid mordanting solution may be employed instead of the above iodine-iodide solution, as is well known in the art.

The photosensitive surface may be directly exposed, if desired, but I prefer to employ a master negative, which has been properly exposed and developed, from which any desired number of exposures may be made. In the form of color screen shown in Figs. 1 and 2, the intensity variation of each screen or color area varies continuously (but not necessarily uniformly) from one end to the other, and the necessary exposure of the photosensitive surface (or of the surface forming the "master negative") may conveniently be secured by employing a shutter mechanism which moves longitudinally of the area 1 or 2, the shutter moving continuously along the length of the photosensitive surface at a rate dependent upon the exposure desired for the particular transmission characteristics of the finished color screen, as will be apparent to those skilled in the photographic arts.

In Figs. 3 and 4 I have shown two strips A' and B' which differ from the strips A and B in the character of the exposure of the photosensitive surface, providing a plurality of uniformly exposed areas which, after development, provide contiguous areas of progressively diminishing (or increasing) density. Assuming that the strips A' and B' represent the yellow and blue components desired in a comparator for use with Bromthymol Blue indicator, the color area 3 for the strip A' may advantageously comprise seventeen rectangular areas of uniform intensity, ranging from a maximum intensity of yellow at the left end to a minimum intensity of yellow at the right end and, similarly, a color area 4 on the strip B' will have a corresponding number of rectangular areas of uniform intensity varying from a minimum intensity of blue at the left end to a maximum intensity of blue at the right end. When the two strips are superimposed, as shown at A'B' in Fig. 5, so that the left-hand end of strip A' overlies the left-hand end of strip B', the complete comparator will comprise a series of seventeen rectangular areas each of uniform color and varying from a deep yellow at the left end through a yellow-green, green and blue-green to a blue at the right end. The respective areas may be marked in accordance with the corresponding pH value, i. e., from 6.0 to 7.6, as indicated, such marking being placed on either of the screens, or on a separate transparent layer, as will be apparent.

The form of invention illustrated in Figs. 6 and 7 is entirely comparable to the form illustrated in Figs. 1 and 2 with the exception that the colored areas 7 and 8 are laid out in circular fashion instead of along a line, and when the two areas are superimposed so as to bring the lightly stained end of one over the deeply stained end of the other, a colored annulus will result which varies progressively from one color at one end through an intermediate color to another color at the other end.

It will be appreciated that it is not essential that a photosensitive silver surface be employed in the production of the color scales, in view of the applicability of the bichromated gelatine process. Similarly, the so-called "developed-relief" process may be employed in the production of the dye-image, or the dye-image may be produced by imbibing. According to the conventional technique with bichromated gelatine media, the sensitized layer of gelatine is exposed through a suitable negative to cause a photochemical hardening or insolubilizing of the portions corresponding to the transparent areas of the negative, and the layer then washed in warm water to remove the unexposed portions, followed by a staining of the layer in a suitable dye solution. Where the above process is employed in the preparation of comparators according to the present invention, the sensitive layer may be directly exposed according to the transmission characteristics of the particular indicator dye at the selected wavelength or color band, or, as a modification of the procedure, a master negative may be produced, as suggested above. It will be appreciated that in the "developed-relief" or in the bichromated gelatine method, the indicator dye itself may be employed to stain the dye matrix, the yellow screen corresponding to the strip A or A' being stained with a solution of Bromthymol Blue at a pH of 6.0, for example, and the blue screen corresponding to the strip B or B' being stained with a similar solution at a pH of 7.6. In such cases, the "match" of the color of the screen will be exact with the color of the indicator itself, inasmuch as the same dye is employed, but substantial matches may be secured by using dyes (acid or basic as the case may be) which closely approximate the actual color of the desired indicator dye.

According to a preferred practice of the invention, the separate strips carrying the respective color components are preferably separated from one another when superimposed, as by disposing a transparent strip of dye-impermeable material such as Celluloid, glass, or the like between the dyed components, in order to prevent interdiffusion of the dye. The color strips may be formed on a flexible backing material such as Celluloid, as by using a suitable photographic "film", in which case it is desirable, although not essential, to provide some protection for the film as by means of glass or clear resin plates covering the films and intersecured in any suitable manner as by means of a binding tape. Alternatively, the color strips may be formed on a conventional photographic "plate", the emulsion surfaces of which are disposed in a facing relation (preferably with an intermediate transparent separating strip as above described) and intersecured in any suitable manner.

Other modifications of the process will occur to those interested in the art and I do not choose to be limited to the specific embodiments herein delineated and described but rather to the scope of the subjoined claims. For example, the process is clearly amenable to the employment of double emulsion films or plates which are selectively stained with the desired dyes. Furthermore, it will be appreciated that where comparators are desired for use with other indicators, such as Bromphenol Blue, Bromcresol Green, Chlorphenol Red, and the like, the proper dye for preparation of the color scale for each color component may be selected from dyes of known transmission characteristics, after the necessary spectroscopic examination for the determination of the color transmission characteristics of the particular indicator.

I claim:

1. The method of preparing a comparator for use in pH determinations with a particular indicator dye having various color and intensity transmission characteristics at various pH values in solution, which comprises: determining the spectrum transmission characteristics of a solution of such a dye at numerous selected pH values throughout the pH range thereof; photographically exposing a photosensitive surface on an elongated transparent member and dye-toning said surface in such manner as to produce a dye-image on said member, of graded intensity, and having various color-transmission characteristics along its length in accordance with the spectrum transmission characteristics of such indicator dye solution at said various pH values.

2. The method of preparing a comparator for use in pH determinations with a particular indicator dye having various color and intensity transmission characteristics at various pH values in solution, which comprises: determining the spectrum transmission characteristics of a solution of such dye at numerous selected pH values throughout the pH range thereof; and producing a dye-image on an elongated transparent member by photographic exposure of a photosensitive surface and the subsequent dye-toning of said surface with a dye substantially reproducing the changes of such dye solution, in accordance with said spectrum transmission characteristics, said dye-image substantially corresponding in color and density at one end of said member with the color of said indicator dye solution at one end of its pH range and substantially corresponding in color and density at the other end of said member with the color of said dye solution at the other end of its pH range.

3. The method of preparing a comparator for use in pH determinations with a two-color component indicator dye, which comprises: determining the spectrum transmission characteristics of a solution of such dye at two color bands corresponding to said color components, respectively, at various pH values within the pH range of such indicator; producing a dye image on an elongated transparent member by photographic exposure of a photosensitive surface and the subsequent dye-toning of said surface with a dye substantially reproducing one of said color bands, in accordance with the determined spectrum transmission characteristics of said indicator at said one color band; producing a second dye image on another elongated transparent member by photographic exposure of a second photosensitive surface and the subsequent dye-toning of said second surface with a dye substantially reproducing the other of said color bands, in accordance with the determined spectrum transmission characteristics of said indicator at the other of said color bands; and superimposing said two dye-images to form a color scale varying in color from one end to the other in accordance with the color changes exhibited by said indicator at various pH values within its pH range.

4. The method of preparing a comparator for use in pH determinations with a particular two-color component indicator dye, which comprises: determining the spectrum transmission characteristics of a solution of such dye at two color bands corresponding to said color components, respectively, at various pH values within the pH range of said dye; photographically exposing a photosensitive surface on an elongated transparent member and dye-toning said surface with a dye substantially reproducing one of said color bands in such manner as to produce a dye-image on said member, of graded intensity, and varying in color-transmission characteristics along its length in accordance with the spectrum transmission characteristics of such indicator dye at said one color band at said various pH values; photographically exposing a second photosensitive surface on a second transparent member and dye-toning said second surface with a dye substantially reproducing the other of said color bands in such manner as to produce a dye-image on said second member, of graded intensity, and varying in color transmission characteristics along its length in accordance with the spectrum transmission characteristics of such indicator dye at the other of said color bands at said various pH values; and superimposing said two dye images to form a color scale varying in color and intensity from one end to the other in substantial accordance with the color changes exhibited by said indicator at various pH values within its pH range.

5. The method of preparing a comparator for use in pH determinations with a particular indicator dye having various color and intensity transmission characteristics at various pH values in solution, which comprises: determining the spectrum transmission characteristics of a solution of such dye at numerous selected pH values throughout the pH range thereof; photographically exposing a gelatine-containing photosensitive surface on an elongated transparent member, producing a gelatine-relief image on said surface in accordance with said exposure, and dyeing said gelatine-relief image with an aqueous solution of said indicator dye, said steps of exposing, producing and dyeing said image being carried out in accordance with the said spectrum transmission characteristics of said indicator dye in such manner as to produce a dye-image on said member, of graded intensity, and having various color-transmission characteristics along its length in accordance with the spectrum transmission characteristics of such indicator dye solution at said various pH values.

6. The method of preparing a comparator for use in pH determinations with a two-color component indicator dye, which comprises: determining the spectrum transmission characteristics of a solution of such dye at two color bands corresponding to said color components, respectively, at various pH values within the pH range of such indicator; photographically exposing a gelatine-containing photosensitive surface on an elongated transparent member, producing a gelatine-relief image on said surface, and dyeing said gelatine-relief image with an aqueous solution of said indicator dye at a pH at one end of the pH range thereof, said steps of exposing, producing and dyeing said image being carried out in accordance with the spectrum transmission characteristics of said indicator dye at one of said color bands; photographically exposing a second gelatine-containing photosensitive surface on a second elongated transparent member, producing a gelatine-relief image on said second surface, and dyeing said last-named gelatine-relief image with an aqueous solution of said indicator dye at a pH at the other end of the pH range thereof, said steps of exposing, producing and dyeing said second gelatine-relief image being carried out in accordance with the spectrum transmission characteristics of said indicator dye at the other of said color bands; and superimposing said two dyed images to form a color scale varying from one end to the other in accordance with the color changes exhibited by said indicator at various pH values within its pH range.

7. A comparator for use in pH determinations with a particular indicator dye in solution, said dye being one having various color and intensity transmission characteristics at various pH values, which comprises: an elongated transparent member provided with a photographically-produced dye image along its length, said dye image corresponding in color and intensity to the color and intensity of a given solution of said indicator dye at a given point of said member and varying in color and intensity along its length in accordance with the variation in color and intensity of said indicator dye at various pH values within its pH range.

8. A comparator for use in pH determinations with a particular indicator dye having predominating color transmission characteristics in two separate color bands, which comprises: an elongated transparent member provided with a photographically-produced dye image substantially reproducing one of said color bands and varying in intensity along its length in accordance with the variation in the spectrum transmission characteristics of a solution of said dye at said one color band at various pH values within its pH range; a second elongated transparent member provided with a photographically-produced dye image substantially reproducing the other of said color bands superimposed upon said first-named transparent member in such manner that said two dye images are superimposed, said second-named dye image varying in intensity along its length in accordance with the variation in the spectrum transmission characteristics of such solution of said dye at said other color band at various pH values within its pH range, and said superimposed dye images providing a composite color screen varying in color and intensity along its length in accordance with the variation in color and intensity exhibited by said indicator dye at various pH values within its pH range.

9. The comparator set forth in claim 8, and comprising in addition, a transparent dye-impermeable member disposed between said two dye images to prevent diffusion of dye therebetween.

10. A comparator for use in pH determinations with a particular indicator dye in solution, such solution having predominating color transmission characteristics in two separate color bands and varying in such transmission characteristics throughout the pH range of the dye, which comprises: two superimposed elongated transparent members each provided with a photographically-produced dye-retaining matrix varying in dye-retaining characteristics along its length, one of said matrices being impregnated to progressively increasing densities along its length with a dye substantially reproducing one of said color bands and the other of said matrices being impregnated to progressively increasing densities along its length with a dye substantially reproducing the other of said color bands, said dye-impregnated transparent members being superimposed with the more dense end of one member superimposed on the less dense end of the other member, and the less dense end of the one member superimposed on the more dense end of the other member, whereby the superimposed matrices produce a composite color screen which varies in color and intensity along its length in accordance with the color and intensity variations exhibited by a solution of said indicator dye at various pH values within its pH range.

11. The comparator set forth in claim 10, and comprising in addition, a dye-impervious transparent member disposed between said two matrices to prevent diffusion of dye therebetween.

DONALD K. ALLISON.